March 9, 1954   C. O. CHRISTENSEN   2,671,488
WHEEL
Filed March 13, 1950   2 Sheets-Sheet 1
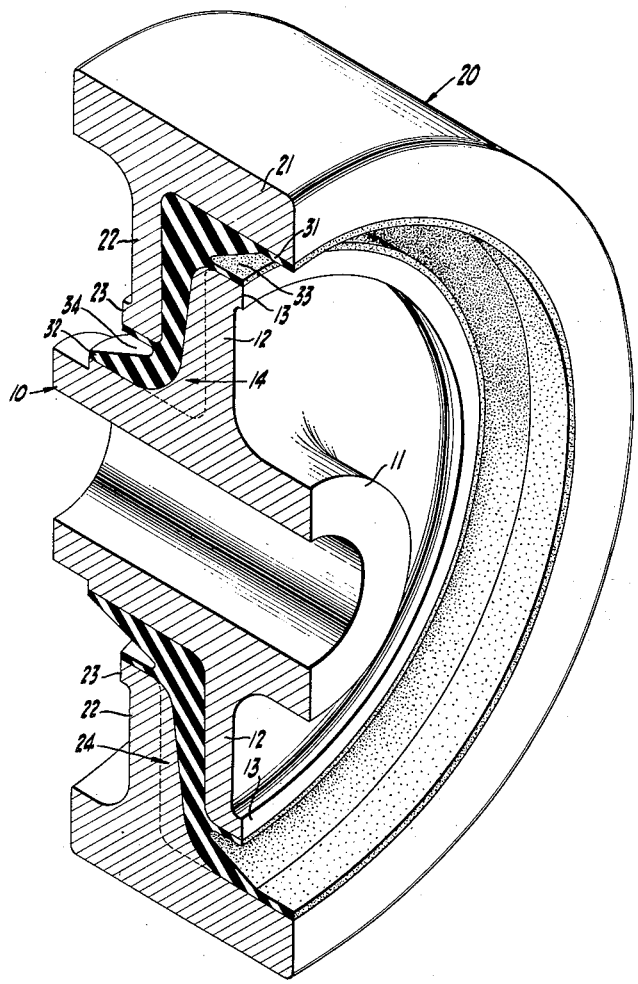
FIG_1
INVENTOR.
CARL O. CHRISTENSEN
BY
*Mellin and Hanson*
ATTORNEYS March 9, 1954 C. O. CHRISTENSEN 2,671,488
WHEEL
Filed March 13, 1950 2 Sheets-Sheet 2
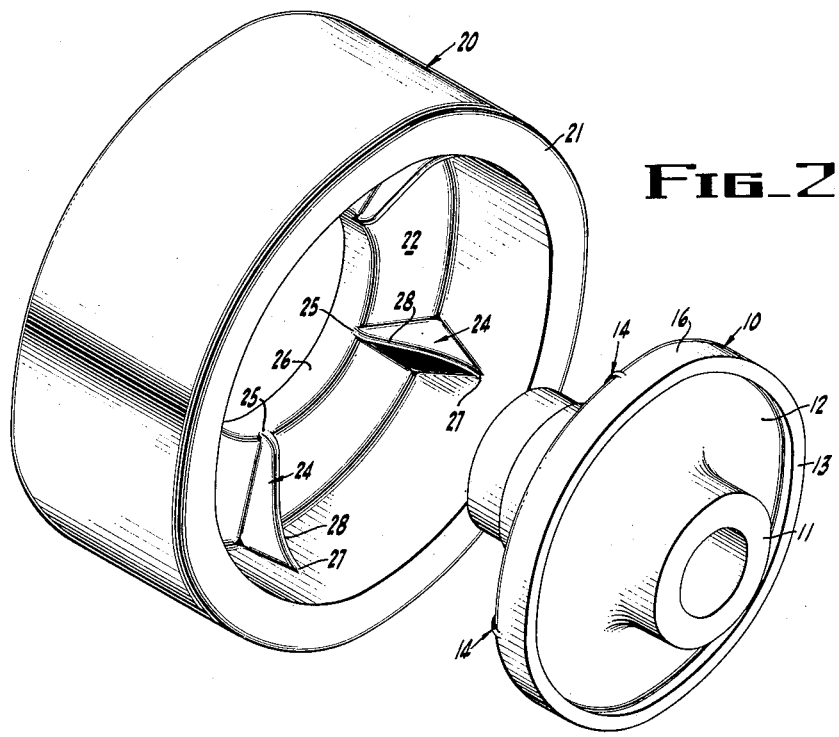
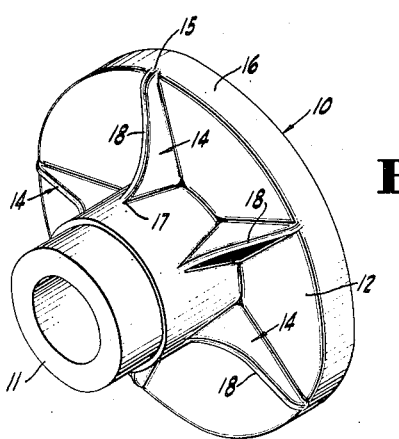
INVENTOR.
CARL O. CHRISTENSEN
BY
*Mellin and Hanscom*
ATTORNEYS Patented Mar. 9, 1954

2,671,488

UNITED STATES PATENT OFFICE 2,671,488

WHEEL

Carl O. Christensen, Walnut Creek, Calif., assignor to Roll-Rite Corporation, Oakland, Calif., a corporation of California Application March 13, 1950, Serial No. 149,291

4 Claims. (Cl. 152—41)

This invention relates to wheels and is particularly concerned with resilient wheels of the type in which a rigid wheel rim is mounted concentrically with a rigid wheel hub, resilient means being interposed between the rim and hub.

Resilient wheels of various types involving rigid surface-engaging rims and rigid hubs with rubber or a like elastomer cushioning means therebetween having long been contemplated, numerous efforts have been made to produce a commercially successful wheel of such type. Among the numerous advantages of such wheels is that, while the intervening cushioning structure provides a take-up for vibration between the rim and the hub so as to cushion the load and materially decrease noise, they also have the advantage of avoiding the contact of a rubber or like resilient tire with the supporting surface by which they are subjected to wear and tend to spread under a heavy load, materially resisting the free movement of the vehicle and rendering turning of the wheels difficult.

In such devices heretofore proposed the rubber is located directly between concentric and radially parallel portions of the rim and hub so that the rubber will be under radial compression between the floor-engaging point of the tire and the portion of the hub vertically thereabove. Rubber under such compressional strains rapidly becomes fatigued and stressed and will eventually take a permanent "set" in response thereto. Thus the rim will become eccentric with respect to the hub. Applicant has found that with elastomers such as rubber, neoprene, Duprene or similar materials, and particularly neoprene, a tension as distinct from compression will not so fatigue the material and will not subject the material to a "set."

It is, therefore, among the general objects of the present invention to provide a novel and improved resilient wheel in which an elastomer is so mounted as to avoid a "set" of such material as the result of loads imposed between the hub and tire of the wheel.

Similarly, it is an object of the present invention to provide a wheel in which a resilient material is mounted to receive the weight between the hub and rim through the imposition of tension on the material without subjecting such material to compressional stress or strain.

A further object of the present invention is to provide a wheel in which the rim is mounted with respect to the hub by means of an elastomer disposed axially between the hub and rim whereby the load-carrying portion of such resilient material is free from any compression due to the imposition of load between the hub and the rim.

A further object of the present invention is to provide a novel, resilient wheel in which neoprene is used as the cushioning medium between the hub and rim and one in which the position of such neoprene is such as to preclude the subjection thereof to compression.

A further important object of the present invention is to provide a hub and rim assembly having internal ribs so constructed and arranged as to engage the resilient material disposed therebetween in such manner as to materially increase the bonding area of the hub and rim with respect to the resilient material and whereby the vulcanizing of such material to the elements will be materially enhanced and further provides for a structure by which the hub and rim are securely locked for rotation together and in such manner as to preclude the relative rotation of one with respect to the other.

Numerous other objects and features of the present invention will be apparent from a consideration of the following specification taken in conjunction with the accompanying drawings, in which:

Fig. 1 is a perspective view of the wheel formed in accordance with the present invention, with the wheel cut radially through the center thereof.

Fig. 2 is an exploded perspective view of the rim and hub sections of the wheel shown in Fig. 1 without the intermediate cushion element.

Fig. 3 is a perspective view of the hub section of the wheel shown in Fig. 1 taken looking toward the inner face thereof.

In general terms, the wheel of the present invention may be defined as comprising a rigid, preferably cast hub section having a flange extending radially outward from a central cylindrical portion, which flange has a plurality of axially directed tapering radial ribs formed on the inner face thereof and a rigid rim having a surface-engaging outer periphery and a radial flange arranged in axial spaced, parallel relation to the flange of the hub and provided with inwardly directed rims similar to the rims of the hub together with a uniting and cushioning element preferably formed of an elastomer disposed between the flanges in lateral relation and free from the possibility of any radial compression so that any load between the hub and rim will be carried by the elastomer as a tension load. It will be understood, of course, that the material between the hub and rim is vulcanized therebetween under compression.

Referring now more particularly to the drawings, the numeral 10 designates the hub which is preferably a metallic casting and consists of a substantially cylindrical portion 11 having a radially extending flange 12 adjacent one end thereof. The periphery of flange 12 is provided with a reinforcing lip 13 extending laterally from the outer face thereof. As may be noted more particularly in Fig. 3, the inner face of the flange 12 is provided with a plurality of ribs 14 which are of tapering height, increasing from the periphery of the flange, at which point as indicated at 15 the rib turns sharply down to converge with the peripheral external surface 16 of the flange and increases inwardly to a point 17 where it turns sharply to merge with the outer wall of the cylindrical portion 11 of the hub. It will also be noted that the cross sections of the rib 14 are of substantially triangular form providing a relatively sharp pointed edge 18 for each of the ribs.

Five ribs 14 are here shown. While the specific number of ribs is not of material importance, the number of ribs of the hub is preferably equal to the number of ribs of the rim of the wheel and, in uniting the hub with the rim, the ribs of the rim are disposed intermediate the ribs of the hub in equal spaced relation. The height of the ribs with respect to the thickness of the resilient material therebetween is such that the combined height of the ribs through any axial section taken through the wheel is never equal to the thickness of the elastomer and therefore there is no possibility of subjecting the resilient material to compressional strain even though there may be a considerable torque established between the rim and the hub.

As more clearly shown in Fig. 2 of the drawings, the rim 20 of the wheel, also preferably a metallic casting, comprises an annular cylindrical tire 21 together with an inwardly directed flange 22 adjacent one edge thereof having an inner peripheral reinforcing rim 23. Flange 22 is provided with ribs 24 of identical curvature and cross section as the ribs 14 and thus including inner abruptly turning ends 25 merging with the inner periphery 26 of the flange and outer oppositely abruptly turning portions 27 which merge with the inner surface of the tire 21. The ribs 24 are also of like cross section with the ribs 14 and thus are substantially triangular in cross section, the portions 27 and 28 corresponding with the characteristics of the ribs 14 indicated by the numerals 15, 17 and 18.

As more clearly indicated in Fig. 1, there is mounted between the flanges 12 and 22 a resilient connecting cushion or sandwich preferably formed of neoprene, but which may be of any other elastomer. While, as indicated in Fig. 1, the neoprene, after being mounted and vulcanized between the flanges 12 and 22, is of the shape conforming to the ribs, it will be understood of course that the neoprene is not in such form when originally positioned between the flanges.

In the manufacture of the wheel of the present invention, the neoprene is laid upon one or the other of the flanges and the other flange is laid thereover, and the two parts are urged together under considerable pressure and at a suitably elevated temperature so that the neoprene flows as it is vulcanized to the flanges in a manner to conform with the ribs. As indicated at 31, the neoprene will flow outwardly from between the flanges and will assume a position between the lips 13 of the hub portion and the tire section 21. It will also flow between the lip 23 of the tire section and the cylindrical portion of the hub as indicated at 32. As seen at 33 and 34, the neoprene is recessed at the rims 13 and 23. Such recesses are provided by the use of molds in conjunction with the vulcanizing of the neoprene to the flanges 12 and 23. It will be noted that the material thus extending between the peripheral inner edge of the tire section and the peripheral outer edge of the hub section is so recessed as to preclude any compressional strain applied thereto. However, it will be understood that if such material did extend between these portions of the structure and was subjected to compressional strain it would be of no consequence since the entire load is taken by the tensional stress applied to the central body of the material.

From the foregoing it will be seen that the elastomer is securely bonded by vulcanization to the opposed inner faces of the flanges 12 and 22. One virtue of the ribs 14 and 24 is to increase the area of vulcanization so as to ensure permanency of the bond. It will be noted that since the flanges are laterally spaced by the intervening material and since the material radially between the hub and rim is recessed as indicated, the entire load between the rim and hub is absorbed in the material as a sheer force acting to tension the material and in no case is there any compression of the material. As pointed out, since the combined heights of the alternate ribs is less than the thickness of the material, there is no compressional force acting between alternate ribs even though considerable torque between the hub and rim may be set up. Since, as before noted, elastomers in general, and neoprene in particular, is not so prone to fatigue and "set" under tension as under compression, the elasticity and hence useful life of the present wheel are greatly improved.

It will of course be understood that in the practice of the present invention numerous changes, modifications and the full use of equivalents may be resorted to without departure from the spirit or scope of the invention as outlined in the appended claims.

Having thus described my invention, what I claim and desire to secure by Letters Patent is:

1. A resilient wheel comprising a hub having a radial flange with a substantially flat inner surface normal to the axis of the wheel provided with inwardly projecting radial ribs, a rim having a radial flange with a substantially flat inner surface normal to the axis of the wheel provided with inwardly projecting radial ribs, said flanges being axially spaced from one another, the inner diameter of the rim flange being smaller than the outer diameter of the hub flange, and an intermediate elastomer uniting said flanges and vulcanized thereto, the axial spacing of the flanges being such that the ribs of the opposed flanges do not circumferentially overlap one another, whereby the elastomer is not put under compression between the ribs.

2. A wheel comprising a cast metallic hub having a cylindrical central body and a radially disposed flange adjacent one end thereof, said flange having an inwardly disposed substantially flat face normal to the axis of the hub, said face including a plurality of radial ribs each of triangular cross section and of decreasing height radially outward and extending from the body to the periphery of the flange, a cast metallic rim having a coaxial tire centrally located with respect to the ends of the body of the hub and having a radially disposed flange adjacent the end thereof opposite the end of the body to which its flange is adjacent so that said flanges are axially spaced, the flange of said rim having a substantially flat inwardly facing surface parallel to the inner face of the flange of the hub with an equal plurality of similarly formed ribs arranged intermediate the ribs of the flange of the hub, and an elastomer cushioning and connecting disc vulcanized to each of said faces.

3. A resilient wheel comprising a hub having a radial flange normal to the axis of the wheel provided with inwardly projecting radial ribs, a rim having a radial flange normal to the axis of the wheel provided with inwardly projecting radial ribs, and an intermediate elastomer uniting said flanges and vulcanized thereto, the axial spacing of the flanges being such that the ribs of the opposed flanges do not circumferentially overlap one another, whereby the elastomer is not put under compression between the ribs.

4. A resilient wheel comprising a hub having a radial flange normal to the axis of the wheel provided with inwardly projecting radial ribs, a rim having a radial flange normal to the axis of the wheel provided with inwardly projecting radial ribs, and an intermediate elastomer uniting said flanges and vulcanized thereto, said elastomer having formed therein a circumferential indentation between the periphery of the radial flange on the hub and the inner face of the rim, the axial spacing of the flanges being such that the ribs of the opposed flanges do not circumferentially overlap one another, whereby the elastomer is not put under compression between the ribs.

CARL O. CHRISTENSEN.

References Cited in the file of this patent

UNITED STATES PATENTS

| Number | Name | Date |
| --- | --- | --- |
| 2,168,900 | Eaton | Aug. 8, 1939 |
| 2,409,052 | MacLean | Oct. 8, 1946 |
| 2,532,319 | MacLean | Dec. 5, 1950 |
| 2,544,889 | MacLean | Mar. 13, 1951 |

FOREIGN PATENTS

| Number | Country | Date |
| --- | --- | --- |
| 14,400 | France | Nov. 27, 1911 |
| 775,510 | France | Dec. 3, 1934 |